United States Patent [19]

Bauer et al.

[11] 4,165,347

[45] Aug. 21, 1979

[54] THERMOPLASTIC IONIC POLYMER COMPOSITIONS

[75] Inventors: Richard G. Bauer, Kent; Diego C. Rubio, Akron, both of Ohio

[73] Assignee: The Goodyear Tire & Rubber Company, Akron, Ohio

[21] Appl. No.: 920,428

[22] Filed: Jun. 29, 1978

[51] Int. Cl.$^2$ .......................... C08L 9/00; C08L 47/00
[52] U.S. Cl. ........................................ 525/69; 525/76; 526/272; 526/317
[58] Field of Search .................. 260/887, 892, 876 R, 260/890

[56] References Cited

U.S. PATENT DOCUMENTS

| | | | |
|---|---|---|---|
| 2,944,044 | 7/1960 | Baer | 260/892 |
| 3,705,137 | 12/1972 | Kuwakara et al. | 260/892 |

*Primary Examiner*—J. Ziegler
*Attorney, Agent, or Firm*—J. D. Wolfe

[57] ABSTRACT

A thermoplastic ionic polymer composition composed of 10 to 90 weight percent of a soft segment ionic polymer and 90 to 10 weight percent of a hard segment ionic polymer reacted with at least 10% to 100% of a metal ion based on the amount of free acid in said composition.

5 Claims, No Drawings

THERMOPLASTIC IONIC POLYMER COMPOSITIONS

The present invention relates to novel blends of ionic polymers to produce a nonhomogeneous thermoplastic elastomer. More particularly, this invention relates to a blend of a hard segment containing ionic copolymer with a soft segment containing ionic copolymer to produce an incompatible blend of thermoplastic elastomers having certain improved physical properties.

Ionic polymers are well known as shown by U.S. Pat. Nos. 3,264,272, 3,404,134 and 3,471,460 or the article on "*Ionomer Graft Copolymers of polystyrene-polybutylacrylate*" by B. Vollmert and W. Schoene, appearing at page 145 of the volume: "*Colloidal and Morphological Behavior of Block and Graft Copolymers*", edited by G. Molan. These ionic copolymers have physical properties that are generally inferior to those of the injection molded grade ethylene-propylene diene polymers (EPDM) which are used in automobile facia.

Therefore, the object of this invention is to provide a blend of at least two incompatible ionic polymers to produce thermoplastic elastomers.

In general, the objects and advantages of this invention can be achieved by blending at least two carboxylated polymers together, then the ionic polymer is created by reacting with a suitable alkali or alkaline earth metal salt, either prior to the blending or during or after the blending step to form a blend of incompatible ionomer type polymers.

Generally, the ionic polymers useful in making the blends of this invention can be divided into two classes, a hard segment polymer and a soft segment polymer.

The hard segment polymers can be viewed as a copolymer of an acidic monomer such as acrylic acid and methacrylic acid alone or combined or these acidic monomers with itaconic acid or anhydride with an α-olefin such as styrene, α-methylstyrene, chlorostyrene, tert.-butyl or tert.-amyl styrene and vinyl toluene. In one sense, the bead segment polymers can be viewed as a copolymer of an acidic monomer and an aromatic α-olefin.

The soft segment polymer can be viewed as a copolymer of an acidic monomer such as acrylic acid and methacrylic acid, alone or combined or these acidic monomers with itaconic acid or anydride with diolefins of 4 to 10 carbon atoms such as butadiene, isoprene, pentadiene-1,3.

It is a preferred embodiment of this invention that the acidic monomer be introduced by incremental copolymerization during the preparation of either the hard or soft segment polymers rather than at the same time as the resulting properties are superior. Also, it has been observed that at least 10% level by weight of the acidic monomer such as methacrylic acid in the copolymers yields blends that have improved elongation at break and tensile strength.

The nature of this invention and its advantages will be readily apparent from the following representative and illustrative examples wherein all parts and percentages are by weight unless otherwise indicated.

EXAMPLE I

Stable latices of the ionic polymers useful in this invention were prepared at 60° F. using a 1.65 phm (hundred parts per million) linear alkyl sulfonate soap system. A typical polymerization recipe is shown below.

Table 1

| Carboxylated Styrene | PHM |
|---|---|
| Water | 188 |
| Sodium Sulfate | 0.15 |
| Sodium Hydroxide | 0.22 |
| Linear Alkyl Sulfonate | 1.65 |
| Ferrous Sulfate | 0.00165 |
| Ethyl Diamine Tetraacetic Acid (34%) | 0.22 |
| Sodium Formaldehyde Sulfoxylate | 0.0165 |
| Sodium Hydrosulfite | 0.011 |
| Methacrylic Acid* (MAA) | Variable |
| Styrene* (S) | Variable |
| Butadiene*(B) | Variable |
| t-Dodecyl Mercaptan | 0.75 |
| p-Menthane Hydroperoxide (50%) | 0.06 |

*Charged according to composition desired with it being understood styrene will be omitted where soft segment latices are to be produced and butadiene will be omitted where hard segment copolymers are needed.

A number of latices were made using the above recipe where amounts of methacrylic acid, styrene and butadiene used is as shown in Table 2.

Table 2.

| Latex No. | % Charge Composition | % Conversion | % MAA in Polymer |
|---|---|---|---|
| 30 | 95 Butadiene/5 MAA | 60 | 8.3 |
| 18 | 90 Butadiene/10 MAA | 61 | 16.4 |
| 19 | 95 Styrene/5 MAA | 80 | 6.3 |
| 13 | 90 Styrene/10 MAA | 82 | 12.2 |
| 55 | 60 Butadiene/30 Styrene/ 10 MAA | 50 | 20.0 |

The above numbered latices were used after steam stripping to make the blends shown in Table 3. The blends were salt-acid coagulated.

The crosslinking or cure reaction was carried out in a 130° C.–150° C. mill where one-half the amount of barium (as $Ba(OH)_2 \cdot 8H_2O$) to stoichiometrically react with the acid was added.

Table 3

| Blend No. | Blend Composition | | | | % Total MAA | 100% Modulus MPa | Tensile MPa | Elongation |
|---|---|---|---|---|---|---|---|---|
| | % Soft Copolymer | | % Hard Copolymer | | | | | |
| 27 | 75% | 95 Butadiene / 5 MAA | 25% | 90 Styrene / 10 MAA | 7.8 | 0.1 | 0.2 | 500 |
| 28 | 75% | 95 Butadiene / 5 MAA | 25% | 90 Styrene / 10 MAA | 9.3 | 0.1 | 0.4 | 420 |
| 29 | 75% | 90 Butadiene / 10 MAA | 25% | 95 Styrene / 5 MAA | 13.7 | 7.4 | 15.6 | 250 |

Table 3-continued

| Blend No. | Blend Composition | | | | % Total MAA | 100% Modulus MPa | Tensile MPa | Elongation |
|---|---|---|---|---|---|---|---|---|
| | % Soft Copolymer | | % Hard Copolymer | | | | | |
| 30 | 75% | 90 Butadiene / 10 MAA | 25% | 90 Styrene / 10 MAA | 15.2 | 6.3 | 15.9 | 280 |

It should be noted that MAA (methacrylic acid) may be replaced with acrylic acid or a blend of said acids with either itaconic acid or its anhydride in above recipes to give blends having physicals resembling those of EPDM rubber.

In the coagulation method when the latex contacts the aqueous metal hydroxide solution, immediate precipitation occurs which is unlikely to be due to the instantaneous reaction of the acid and the hydroxide but more likely due to a reaction with the emulsifier. It is possible the crosslinking reaction occurs predominantly on the surface of the coagulated latex particles. Thus, care should be utilized to control the rate of coagulation to insure reproducibility of crumb size.

A more reliable method for ionomer formation is by hot milling the polymers together with the metal hydroxide. This procedure from the stress-strain behavior of our coagulated and milled samples indicates the milled mixed material gave as a rule higher tensile strength and elongation but lower modulus than coagulation methods.

An amine may be used to reduce fines from the salt/acid coagulation of latex. In the case of carboxylated polymers, however, an amine or quaternary amine can react with the acid groups to form an amine salt. The competition of the amine and the cation of the metal salt for the acid groups for crosslinking sites usually results in lowering the tensile strength. This effect was experienced where a small amount of a polyamine (Nalco 107 TM) was added to the salt/acid coagulant. With the lowering of the tensile strength, improvement of compression set was, however, observed.

In general, it was found that the metal ions of U.S. Pat. No. 3,264,272 could be used to form the crosslinks with the blend of ionic polymers of this invention and when other bivalent metal ions were used instead of barium or magnesium ions, the former ions gave better cured physicals than other ions such as calcium or zinc. It should be appreciated that the metal ion level, i.e. barium preferably varies from about 50% to 100% based on equivalents of free acid in the polymers. Although as little as 10 equivalent weight percent of the metal ion can be used, it is preferred to use higher amounts to give a higher concentration of crosslinks.

It should be appreciated that the blend of soft segment ionic polymers and hard segment ionic polymers produce essentially an incompatible mixture over the range of 10 to 90% respectively, composed of a two-phase domain structure with relatively mobile crosslinks. Consequently, the resulting ionomer blends are thermoplastic in nature and are readily amenable to shaping or molding by extrusion to form auto facia and other molded parts for interior decor of automobiles.

While certain representative embodiments and details have been shown for the purpose of illustrating the invention, it will be apparent to those skilled in this art that various changes and modifications may be made therein without departing from the spirit or scope of the invention.

What is claimed is:

1. A thermoplastic ionic polymer composition composed of 10 to 90 weight percent of a soft segment ionic polymer and 90 to 10 weight percent of a hard segment ionic polymer reacted with at least 10% to 100% of a metal ion based on the amount of free acid in said composition.

2. The composition of claim 1 wherein the soft segment ionic polymer is a copolymer of an acidic monomer and a diolefin of 4 to 10 carbon atoms and the hard segment ionic polymer is a copolymer of an acidic monomer and an aromatic α-olefin, said acidic monomer being selected from the class consisting of acrylic acid, methacrylic, combinations thereof and each of said monomers combined with itaconic acid or itaconic anhydride.

3. The composition of claim 1 wherein the acidic monomer comprises at least 10% of each of the components of the blend.

4. The composition of claim 1 wherein the metal ion is barium or magnesium.

5. The composition of claim 3 wherein the acidic monomer is added incrementally to a polymerization system to incorporate said acidic monomer into the polymer.

* * * * *